(No Model.) 2 Sheets—Sheet 1.

H. & J. KELLY.
PAWL AND RATCHET FOR CHAIN PUMPS.

No. 324,329. Patented Aug. 11, 1885.

Witnesses:
R. E. Grant
G. E. Tucker

Inventors:
Henry Kelly,
Joseph Kelly,
by Johnson and Johnson
Attys.

(No Model.) 2 Sheets—Sheet 2.
H. & J. KELLY.
PAWL AND RATCHET FOR CHAIN PUMPS.
No. 324,329. Patented Aug. 11, 1885.
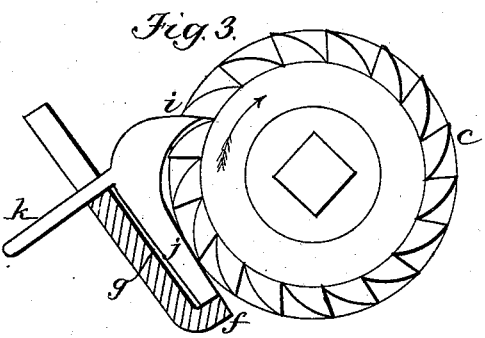
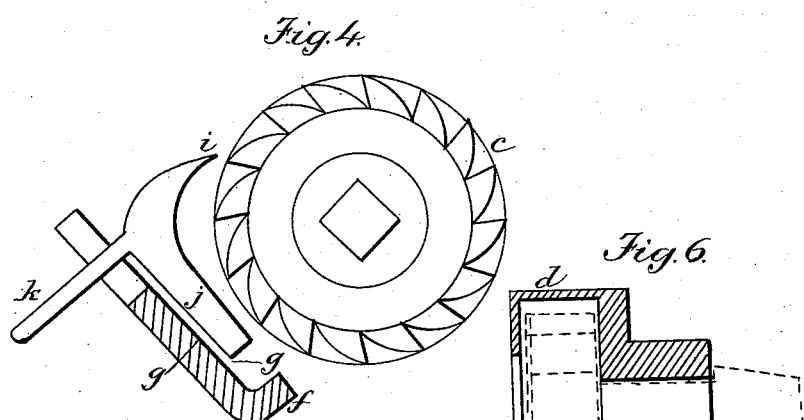
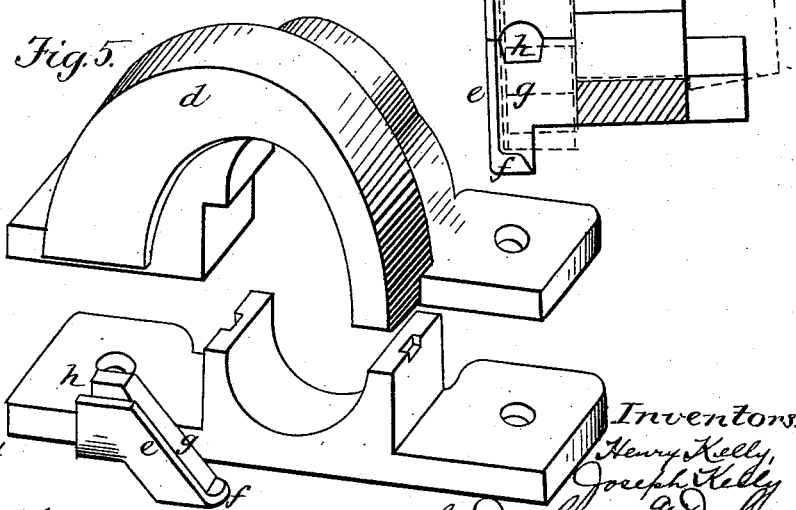
Witnesses: Inventors:
R. E. Grant Henry Kelly
G. E. Tucker Joseph Kelly
by Johnson & Johnson
Attys.

UNITED STATES PATENT OFFICE.

HENRY KELLY AND JOSEPH KELLY, OF OSAGE, IOWA.

PAWL AND RATCHET FOR CHAIN-PUMPS.

SPECIFICATION forming part of Letters Patent No. 324,329, dated August 11, 1885.

Application filed June 17, 1885. (No model.)

*To all whom it may concern:*

Be it known that we, HENRY KELLY and JOSEPH KELLY, citizens of the United States, residing at Osage, in the county of Mitchell and State of Iowa, have invented new and useful Improvements in Pawls and Ratchets for Chain-Pumps, of which the following is a specification.

Our invention relates to improvements in devices for permitting and controlling the reverse motion of the endless chain of buckets used in raising water through a tube; and the object of our improvement is to provide a simple and effective device whereby the motion of the chain may be quickly and easily reversed to free the buckets of water, and controlling such reverse motion automatically, and to afford protection against freezing to the reverse-motion-controlling parts.

The stop-motion device consists of a ratchet-wheel on the shaft of the chain-wheel, and a dog adapted to slide within an open inclined way formed within a housing cast with the journal-bearing box for said shaft, and which incloses and protects the ratchet and the slide-dog. This slide-dog is provided with a handle, by which it is raised up out of engagement with the ratchet-wheel, to permit the chain of buckets to be turned backward to empty the water out of the tubing, and letting go the handle, the dog slides down its inclined seat and automatically engages the ratchet-wheel, to arrest the backward motion of the chain of buckets.

Figure 1:
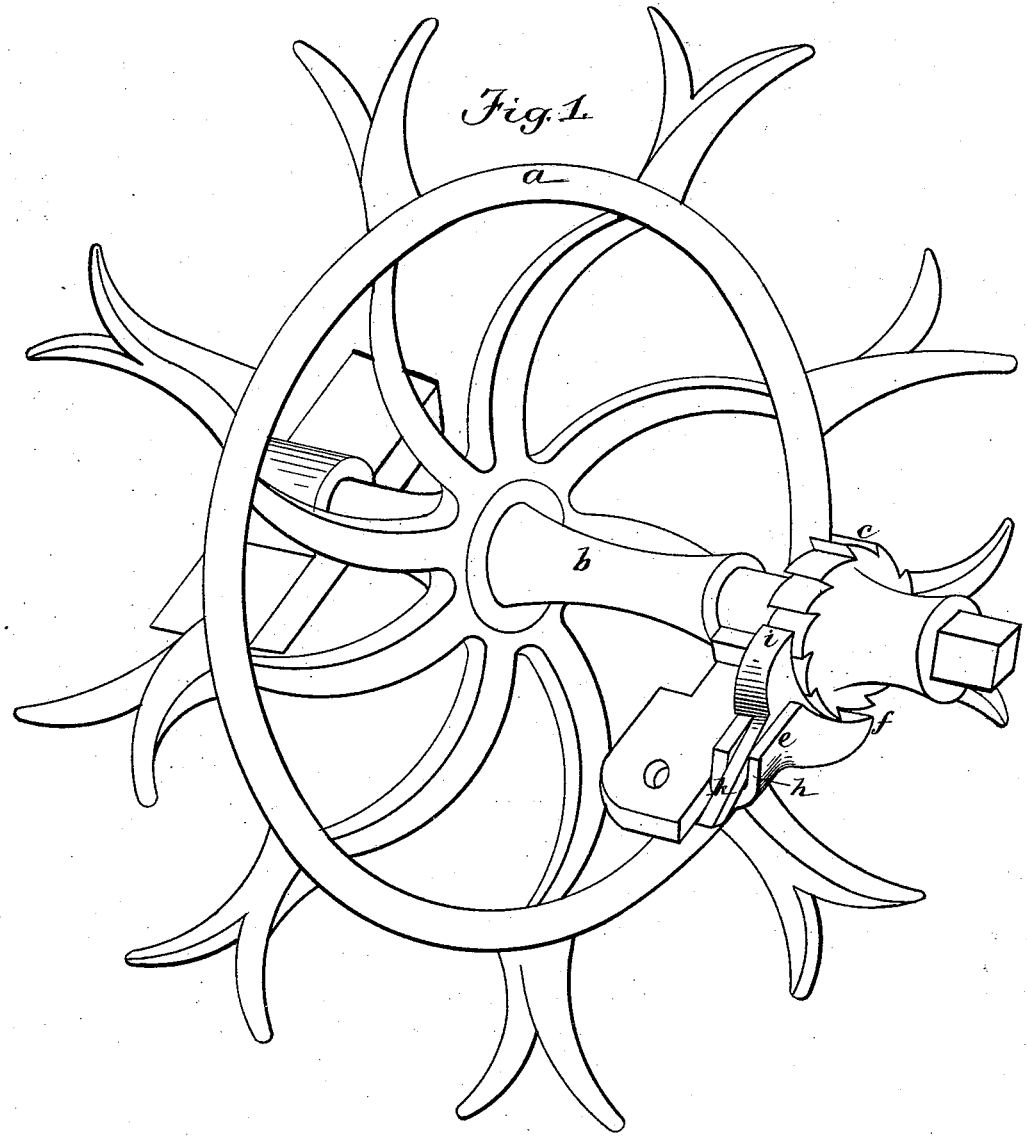
Figure 2:
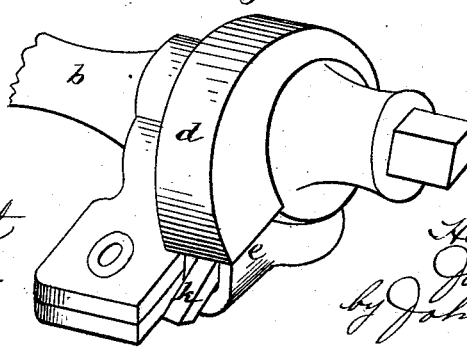

Referring to the accompanying drawings, Figure 1 represents a view in perspective of the sprocket-wheel, showing the ratchet stop-motion device for permitting and controlling the reverse motion of the endless chain of buckets, the protecting-housing being removed; Fig. 2, a similar view with the housing in place; Fig. 3, the ratchet and its controlling slide-dog in position upon its open inclined way, to prevent the endless chain from turning backward. Fig. 4 shows the ratchet and its controlling slide-dog out of engagement to permit the chain to be turned backward. Fig. 5 shows in perspective the two sections of the box separated, one section having the protecting-housing and the other section the open inclined way for the slide-dog; and Fig. 6, a section in the line of the shaft of the bearing and ratchet box.

The sprocket-wheel $a$ is secured upon the shaft $b$ in the ordinary way, and the latter is mounted in bearings at each end in a manner usual in endless-chain pumps. We prefer to cast the ratchet-wheel $c$ integral with the shaft; but it may be made separate and keyed thereon. The ratchet-wheel is placed on the shaft at the outer side of the bearing-box, and the upper section of the latter has a side projecting hood or housing, $d$, which overhangs the box proper and partially incloses the ratchet-wheel. The lower section of the bearing-box has a projection placed on its outer side close to the circumference of the ratchet-wheel, and is formed with an outer side flange or lip, $e$, a bottom lip, $f$, and a straight bottom, $g$, inclining upward at an angle of about eighty degrees, open at the top and at its outer end, $h$, as seen in Fig. 5. The inclined way of this projection stands in a line with the ratchet-teeth, at right angles with the shaft, and the slide-dog is fitted to have a free movement therein. This dog is formed with an upper toothed end, $i$, adapted to engage with the teeth of the ratchet, and a lower straight shank, $j$, having a flat under side to be seated upon the open inclined way. In its normal position it rests upon the bottom lip, $f$, in engagement with the ratchet-wheel, so as to prevent the chain of buckets from turning backward while raising water, as seen in Fig. 3. When, however, it is desired to stop the operation of raising water, the chain of buckets is permitted to have a sufficient reverse motion, produced by the weight of water in the buckets in the tube, to empty the same back into the well, to prevent freezing in the winter and to permit of raising cool water in the summer direct from the well. This reverse motion is permitted by raising the dog by its handle $k$ in the open way, so as to carry its toothed end free of the ratchet-teeth, as seen in Fig. 4. The handle of the dog extends through the top open end, $h$, of the inclined way, and in raising the dog it slides away from the ratchet-wheel, and is held up by hand long enough to permit the chain of buckets to move backward only a distance of a few inches. Letting go the handle of the dog, it slides down the inclined way upon the bottom lip and automatically engages with the teeth of the ratchet-wheel, stopping the reverse motion of the chain.

The side lip of the open inclined way forms a continuation of the ratchet-housing, and these parts are thus protected from the accumulation of ice, from the splashing over from the buckets, from rain, or from snow. This construction permits the ratchet-wheel to turn freely in raising water, as in the ordinary ratchet-wheel and pawl.

The placing of the dog in the open inclined way gives a secure seat to the dog to hold the chain of buckets when the tube is filled with water, and prevents the accidental disengagement of the dog from the ratchet-wheel, while such placing of the dog renders it easy to raise it to free it from the ratchet.

We claim—

1. A sectional ratchet-box for inclosing the ratchet-wheel for chain-pumps, the upper section having the side overhanging hood or housing, and the lower section produced with the side projection having flange $e$ $h$, groove $g$, and seat $f$, forming the inclined way for the slide-dog having a handle, as herein set forth.

2. The combination of the ratchet-wheel for chain-pumps with the slide-dog having a handle and a straight shank, and an inclined grooved slideway having the bottom seat, $f$, as set forth.

3. The combination of the ratchet-wheel for chain-pumps with a slide-dog having a toothed end, a straight shank, and a handle, and a slideway therefor having an outer flange or lip and inner flange, forming an inclined groove and an opening at its top end and a seat at its bottom, all constructed as shown and described.

In testimony whereof we have hereunto set our hands in the presence of two subscribing witnesses.

HENRY KELLY.
JOSEPH KELLY.

Witnesses:
W. D. EATON,
J. G. B. MORGAN.